(12) United States Patent
Lee et al.

(10) Patent No.: US 10,329,694 B2
(45) Date of Patent: Jun. 25, 2019

(54) METHOD FOR MANUFACTURING FUNCTIONAL YARN HAVING DEODORIZATION PROPERTY AND QUICK SWEAT ABSORBENCY

(71) Applicant: HYOSUNG TNC CORPORATION, Seoul (KR)

(72) Inventors: Tae Gyun Lee, Yeoju-si (KR); Min Suk Lee, Anyang-si (KR); Jun Young Park, Ulsan (KR)

(73) Assignee: HYOSUNG TNC CORPORATION, Seoul (KR)

( * ) Notice: Subject to any disclaimer, the term of this patent is extended or adjusted under 35 U.S.C. 154(b) by 200 days.

(21) Appl. No.: 15/516,538

(22) PCT Filed: Nov. 4, 2015

(86) PCT No.: PCT/KR2015/011759
§ 371 (c)(1),
(2) Date: Apr. 3, 2017

(87) PCT Pub. No.: WO2016/076457
PCT Pub. Date: May 19, 2016

(65) Prior Publication Data
US 2017/0292209 A1    Oct. 12, 2017

(30) Foreign Application Priority Data
Nov. 14, 2014 (KR) ........................ 10-2014-0158988

(51) Int. Cl.
| | | |
|---|---|---|
| *C08J 3/22* | (2006.01) | |
| *C08K 3/015* | (2018.01) | |
| *C08K 3/32* | (2006.01) | |
| *D01D 5/12* | (2006.01) | |
| *D01D 5/16* | (2006.01) | |
| *D02G 3/04* | (2006.01) | |
| *D01F 1/10* | (2006.01) | |
| *D06M 11/46* | (2006.01) | |
| *D01D 5/08* | (2006.01) | |
| *C08G 63/91* | (2006.01) | |
| *D01D 5/253* | (2006.01) | |
| *D01F 6/62* | (2006.01) | |

(52) U.S. Cl.
CPC .............. *D02G 3/04* (2013.01); *C08G 63/91* (2013.01); *C08J 3/226* (2013.01); *D01D 5/08* (2013.01); *D01D 5/082* (2013.01); *D01D 5/253* (2013.01); *D01F 1/10* (2013.01); *D01F 1/103* (2013.01); *D01F 6/62* (2013.01); *D06M 11/46* (2013.01); *C08J 2367/00* (2013.01); *C08J 2467/00* (2013.01); *C08K 2003/328* (2013.01); *D10B 2331/04* (2013.01); *D10B 2401/02* (2013.01); *D10B 2401/13* (2013.01)

(58) Field of Classification Search
CPC .......... C08J 3/22; C08J 3/226; C08J 2367/00; C08K 3/015; C08K 3/32; C08K 2003/328; D01D 5/08; D01D 5/12; D01D 5/16; D01D 5/253; D01F 1/10; D01F 1/103; D01F 6/62; D10B 2331/04; D10B 2401/02; D10B 2401/13
USPC ...... 264/177.13, 210.6, 210.8, 211; 523/102; 524/413, 417
See application file for complete search history.

(56) References Cited

U.S. PATENT DOCUMENTS

| | | | |
|---|---|---|---|
| 5,690,922 A * | 11/1997 | Mouri .................... D01F 1/10 424/402 |
| 2006/0182812 A1* | 8/2006 | Ono ...................... A01N 59/16 424/604 |
| 2006/0293416 A1* | 12/2006 | Peeters ................... C08J 3/226 523/351 |
| 2009/0068283 A1* | 3/2009 | Sugiura .................. D01F 1/103 424/618 |

FOREIGN PATENT DOCUMENTS

| | | | |
|---|---|---|---|
| JP | 05-051812 | 3/1993 | |
| KR | 100481358 | 4/2005 | |
| KR | 10-0496044 | 6/2005 | |
| KR | 10-2006-0056074 | 5/2006 | |
| KR | 10-0749762 | 8/2007 | |
| WO | WO-2006054816 A1 * | 5/2006 | ............. D01D 5/253 |

OTHER PUBLICATIONS

International Search Report, issued in the corresponding International PCT application No. PCT/KR2015/011759, dated 8 Mar. 2016, 4 pages.

* cited by examiner

*Primary Examiner* — Leo B Tentoni
(74) *Attorney, Agent, or Firm* — Hamre, Schumann, Mueller & Larson, P.C.

(57) ABSTRACT

The present invention relates to a method for producing a functional yarn, in which zirconium phosphate having a multiple-layered structure is used as a deodorizing material and a melted polymer is spun through a spinning nozzle having a multi-lobal sectional shape. According to the present invention, the melted polymer contains layered fine zirconium phosphate inorganic particles having low hardness, and thus the abrasion of production process equipment can be minimized during fiber production and also an excellent deodorizing property and an excellent sweat-absorbing and quick-drying property are exhibited.

5 Claims, No Drawings

METHOD FOR MANUFACTURING FUNCTIONAL YARN HAVING DEODORIZATION PROPERTY AND QUICK SWEAT ABSORBENCY

TECHNICAL FIELD

The present invention relates to a method for producing a functional yarn having a deodorizing property and a sweat-absorbing and quick-drying property, and more particularly to a method for producing a functional yarn which includes layered zirconium phosphate having low hardness as a deodorizing material, which does not cause abrasion or production equipment during spinning and post-processing processes, and which has an excellent deodorizing property and an excellent sweat-absorbing and quick-drying property.

BACKGROUND ART

Recently, as the demand for high-quality of life has increased, consumers have pursued a concept for fibers and clothes showing high functionality, high emotion, comfortability, aesthetics, and customization; in addition to satisfying basic needs. Accordingly, the demand for functional fibers has increased, and the market of functional fibers has expanded. Due to this background, the development of fibers or fabrics having a self-deodorizing function, i.e., deodorizing fibers, have attracted attention, and fibers and products, which remove odors via various methods, including chemical, biotechnical and biological methods, have been developed.

In general, deodorizing yarns are produced either by adding an additive exhibiting a deodorizing function to thermoplastic resin or by coating yarns with the additive. Deodorizing materials conventionally used include phosphates of tetravalent metals, hydroxides of divalent metals, photocatalysts zirconium phosphate, and the like. Zeolite, talc, hydroxyapatite, silica gel, activated carbon, and the like have been known as inorganic materials that support these deodorizing materials.

However, the deodorizing function of these deodorizing materials is not long lasting, and photocatalysts have the problem of causing damage to yarns made therefrom.

Furthermore, although zirconium phosphate has an excellent deodorizing function, it has high hardness. Therefore, when zirconium phosphate is applied to yarns, a problem arises in that the zirconium phosphate causes the abrasion of either a spinning machine for producing yarns or process equipment in a post-processing process.

Meanwhile, polyester fibers are widely used for clothing and industrial purposes because of their excellent mechanical and chemical properties. However, polyester has the disadvantage of providing a hard tactile sensation due to its high Young's modulus. In addition, polyester has little or no polar functional groups in its molecules, and thus has a poor moisture-absorbing property. Therefore, when polyester is used for a clothing purpose, a problem arises in that polyester provides discomfort when being worn because it rarely absorbs sweat or moisture.

DISCLOSURE

Technical Problem

The present invention is intended to overcome the above-described problems of the conventional art, and an object of the present invention is to provide a method for producing a functional yarn which has an excellent deodorizing property and an excellent sweat-absorbing and quick-drying property and which reduces abrasion of production process equipment to thereby increase process workability.

Technical Solution

In order to accomplish the above object, an aspect of the present invention is directed to a method for producing a functional yarn having a deodorizing property and a sweat-absorbing and quick-drying property, the method including the steps of:

mixing a polyester having an intrinsic viscosity of 0.70-0.95 dL/g with 1-20 wt %, based on the solid content of yarn fiber, of fine zirconium phosphate inorganic particles having a multiple-layered structure, thereby preparing a master batch chip;

mixing the master batch chip with a general polyester chip to obtain a mixture, and melting the mixture at a temperature of 250-270° C., thereby preparing a melted polymer; and melt-spinning the melted polymer through a spinning nozzle having a multi-lobal sectional shape at a spinning temperature of 285-315° C. and an adjusted stretching ratio corresponding to a spinning speed of 2500-4000 m/min.

Advantageous Effects

In accordance with the method for producing a functional yarn having a sweat-absorbing and quick-drying property and a deodorizing property according to the present invention, layered zirconium phosphate having low hardness is used as a deodorizing material, and thus the abrasion of production equipment can be minimized during spinning and post-processing processes. Furthermore, a plurality of hydrogen atoms is bonded between the adjacent layers of the multiple-layered structure, and an excellent deodorizing function is exhibited. In addition, the yarn is produced through a spinning nozzle having a multi-lobal sectional shape, and thus the sweat-absorbing and quick-drying property of the yarn is also improved.

BEST MODE

A method for producing a synthetic fiber having a deodorizing property and a sweat-absorbing and quick-drying property according to the present invention will be described in detail below with reference to embodiments. General terms which are currently widely used are selected as terms used in the present invention as far as possible. However, in specific cases, there may be terms that are discretionally selected by the applicant, in which case the meanings of the terms should be construed by considering the meanings thereof described or used in the detailed description of the present disclosure, rather than simply by considering the names thereof.

In the production of a functional yarn according to the present invention, a master batch chip in which a high concentration of fine zirconium phosphate inorganic particles is mixed with a polyester resin mixed is first prepared using an extruder. The prepared master batch chip is mixed with a general polyester chip to obtain a mixture, and the mixture is melted and then spun through a spinning nozzle having a multi-lobal sectional shape, thereby obtaining a yarn.

The present invention is characterized by using fine zirconium phosphate inorganic particles having a multiple-layered structure in order to impart a deodorizing property to the yarn. The multi-layered zirconium phosphate has a multiple-layered structure, unlike conventional zirconium phosphate. This multiple-layered structure is a structure in which several tens to several hundreds zirconium phosphate single layers are superimposed on one another. The multiple-layered structure can be exfoliated in the form of a thin layer, and thus it has low hardness. Furthermore, a plurality of hydrogen atoms is bonded between the adjacent layers of the multiple-layered structure, and thus a deodorizing function can be improved by the bonded hydrogen atoms.

The zirconium phosphate which is used in the present invention has a Mohs hardness of 4-6, preferably 5. Furthermore, the zirconium phosphate is characterized in that the area capacity thereof capable of removing odor reaches 185 ml/g.

If the Mohs hardness of the zirconium phosphate exceeds 6, the abrasion of production equipment increases during the production of fiber.

The fine zirconium phosphate inorganic particles preferably have a diameter of 0.1-2.0 µm. When the diameter of the fine zirconium phosphate inorganic particles is less than 0.1 µm, the deodorizing function decreases. In contrast, when the diameter is more than 2.0 µm, the dispersion of the fine zirconium phosphate inorganic particles with the polyester resin reduces.

In order to prevent spinnability and physical properties from reducing due to a decrease in viscosity during the preparation of the master batch chip, the polyester resin preferably has a viscosity of 0.70-0.95 dL/g. Furthermore, the fine zirconium phosphate inorganic particles are generally used in an amount of 1-20 wt % based on the solid content of yarn fiber.

In the preparation of the master batch chip, a polyester chip may also be used. In this case, the polyester chip may be previously ground and then used so that the inorganic fine particles and the resin can be easily mixed with each other. In addition, in order to improve the dispersion of the fine zirconium phosphate inorganic particles, the fine zirconium phosphate inorganic particles and the polyester resin are mixed with each other in a rotary mixer and introduced into a twin-screw extruder to prepare the master batch chip.

The prepared master batch chip is mixed with a general polyester chip such that the content of the fine zirconium phosphate inorganic particles is 0.1-3 wt % based on the solid content of yarn fiber. The mixture of the master batch chip and the general polyester chip is melted at a temperature of 250-270° C. to prepare a melted polymer. When the content of the fine zirconium phosphate inorganic particles exceeds 3 wt %, the spinnability of the mixture decreases.

After the prepared melted polymer has been cooled by blowing cooling air having a temperature of 20° C. at a speed of 0.4-0.6 m/min and a spinning oil has been applied, the prepared melted polymer is melt-spun through a spinning nozzle having a multi-lobal sectional shape at a spinning temperature of 285-315° C. and an adjusted stretching ratio corresponding to a spinning speed of 2500-4000 m/min, thereby producing a yarn having a final single-yarn fineness of 0.5-2 denier.

According to the present invention, in order for the fiber to have a multi-lobal shape other than a circular sectional shape, spinning is performed using a spinning nozzle having a multi-lobal sectional shape. Any spinning nozzle having a multi-lobal sectional shape, which can generally be used in the art to which the present invention pertains, may be used as the spinning nozzle having a multi-lobal sectional shape. Preferably, a spinning nozzle which has been originally developed by the applicant and which produces a fiber having a cloverleaf or cross-shaped multi-lobal sectional shape is used. The yarn spun through the spinning nozzle having a cloverleaf or cross-shaped multi-lobal sectional shape exhibits an excellent sweat-absorbing and quick-drying property upon being applied to a product because the surface area of the section of the yarn increases.

The polyester synthetic fiber having a sweat-absorbing and quick-drying property and a deodorizing property, produced as described above, contains layered zirconium inorganic fine particles including hydrogen, and thus has a very excellent deodorizing function. The produced polyester synthetic fiber has a single-yarn fineness of 0.5-2 denier, and exhibits a deodorizing property corresponding to the removal of 85% or more of ammonia and 70% or more of acetic acid. In addition, it has moisture absorbing and drying properties of 50% or more, which correspond to a sweat-absorbing and quick-drying property. Meanwhile, various woven and knitted fabrics may be produced using the produced polyester synthetic fiber.

The present invention will be described in detail with reference to examples. These presented examples are intended merely to specifically illustrate the present invention, and do not limit the scope of the claims of the present invention.

Example 1: Production of Functional Yarn 2 kg of fine zirconium phosphate inorganic particles having a diameter of 1.0 µm and a multiple-layered structure were mixed with 8 g of a polyester resin having an intrinsic viscosity of 0.8 dL/g, thereby preparing a master batch chip containing 20 wt % of the fine zirconium phosphate inorganic particles. In order to increase the dispersion of the fine zirconium phosphate inorganic particles during the preparation of the master batch chip, the fine zirconium phosphate inorganic particles and the polyester resin were mixed with each other in a rotary mixer and introduced into a twin-extruder extruder, and a 200-mesh filter was used. The obtained master batch chip was mixed with a general polyester chip so that the content of the fine zirconium phosphate inorganic particles became 0.5 wt % based on the solid content of yarn fiber. The mixture of the chips was melted at a temperature of 265-270° C. to thereby prepare a melted polymer.

The melted polymer was melt-spun through a spinning nozzle having a cloverleaf-shaped section at a spinning temperature of 305° C. and a spinning speed of 3100 m/min while controlling the amount of discharge so that the single-yarn fineness of the final draw yarn became 1 denier, thereby producing a polyester yarn. The temperature of cooling air was adjusted to 20° C., and a cooling delay portion was disposed immediately below the spinning nozzle and adjusted to 50 mm in length. In addition, the maximum distance between a cooling-air discharge surface and a filament was adjusted to 30 mm.

Example 2: Production of Functional Yarn

A functional yarn was produced in the same manner as described in Example 1, except that the mixing was performed so that the content of fine zirconium phosphate inorganic particles became 1 wt % based on the solid content of yarn fiber.

Example 3: Production of Functional Yarn

A functional yarn was produced in the same manner as described in Example 1, except that the mixing was performed so that the content of fine zirconium phosphate inorganic particles would be 2 wt % based on the solid content of yarn fiber.

Comparative Example 1: Production of Yarn Using General Fine Zirconium Phosphate Inorganic Particles A functional yarn was produced in the same manner as described in Example 1, except that zirconium phosphate particles other than fine zirconium phosphate inorganic particles having a multiple-layered structure were used.

The spinning workability, deodorizing functionality, and moisture absorption and abrasion properties of the polyester yarns produced in the examples and comparative example performed as described above were measured, and the results of the measurement are shown in Table 1 below. Methods for evaluating the respective physical properties were as follows:

1) Spinning Workability

Spinning workability was evaluated based on the number of yarn breakages during spinning.

The case of less 1 yarn breakage/day was evaluated as excellent, the case of 1-3 yarn breakages/day was evaluated as moderate, and the case of more than 3 yarn breakages/day was evaluated as poor.

2) Deodorizing Functionality

Deodorizing functionality was evaluated using the following equation:

{(concentration of residual gas in blank test−concentration of residual gas in example or comparative Example)/concentration of residual gas in blank test}×100

3) Moisture-Absorbing Property

The increase in sample weight after moisture absorption relative to original sample weight for the same period of time was expressed as wt %.

4) Abrasion Property

Each of the yarns was moved on a copper wire at a constant tension and speed, and the distance of movement, measured when the copper wire was broken, was used for evaluation.

TABLE 1

|  | Example 1 | Example 2 | Example 3 | Comparative Example 1 |
| --- | --- | --- | --- | --- |
| Spinning workability | excellent | excellent | excellent | moderate |
| Deodorizing functionality | 80 | 87 | 93 | 13 |
| Moisture-absorbing property | 85 | 85 | 85 | 80 |
| Abrasion property | excellent | excellent | excellent | poor |

Although the preferred embodiments of the present invention have been described in detail above, it will be apparent to those skilled in the art that the scope of the present invention is not limited to the above-described embodiments and the configuration of the present invention may be changed and modified in various ways without departing from the spirit or scope of the invention. Accordingly, the scope of protection of the present invention should be defined based on the attached claims and the range of equivalents thereto.

The invention claimed is:

1. A method for producing a functional yarn having a deodorizing property and a sweat-absorbing and quick-drying property, the method comprising the steps of:

mixing a polyester having an intrinsic viscosity of 0.70-0.95 dL/g with 1-20 wt %, based on a solid content of yarn fiber, of fine zirconium phosphate inorganic particles having a multiple-layered structure, thereby preparing a master batch chip;

mixing the master batch chip with a general polyester chip to obtain a mixture, and melting the mixture at a temperature of 250-270° C., thereby preparing a melted polymer; and melt-spinning the melted polymer through a spinning nozzle having a multi-lobal sectional shape at a spinning temperature of 285-315° C. and an adjusted stretching ratio corresponding to a spinning speed of 2500-4000 m/min, wherein the fine zirconium phosphate inorganic particles have a structure in which several tens to several hundreds zirconium phosphate single-layers are superimposed on one another, and the fine zirconium phosphate inorganic particles have a Mohs hardness of 4-6, and wherein a plurality of hydrogen atoms are bonded between adjacent layers of the multiple-layered structure.

2. The method of claim 1, wherein the fine zirconium phosphate inorganic particles have a diameter of 0.1-2.0 μm.

3. The method of claim 1, wherein preparing the melted polymer comprises mixing the master batch chip and the general polyester chip so that the content of the fine zirconium phosphate inorganic particles becomes 0.1-3 wt % based on the solid content of the yarn fiber.

4. The method of claim 1, wherein the multi-lobal sectional shape of the spinning nozzle is a cloverleaf or cross shape.

5. The method of claim 1, wherein the functional yarn has a single-yarn fineness of 0.5-2 denier, exhibits a deodorizing functional corresponding to removal of 85% or more of ammonia and 70% or more of acetic acid, and has moisture absorbing and drying properties of 50% or more.

* * * * *